US012545296B2

(12) United States Patent
Van Heukelom et al.

(10) Patent No.: US 12,545,296 B2
(45) Date of Patent: Feb. 10, 2026

(54) INTERACTION PREDICTION BASED ON TRACKING TRAJECTORY

(71) Applicant: Zoox, Inc., Foster City, CA (US)

(72) Inventors: Matthew Van Heukelom, San Francisco, CA (US); Chonhyon Park, San Jose, CA (US); Olivier Amaury Toupet, Escondido, CA (US); Marin Kobilarov, Baltimore, MD (US)

(73) Assignee: Zoox, Inc., Foster City, CA (US)

( * ) Notice: Subject to any disclaimer, the term of this patent is extended or adjusted under 35 U.S.C. 154(b) by 418 days.

(21) Appl. No.: 18/204,339

(22) Filed: May 31, 2023

(65) Prior Publication Data

US 2024/0400103 A1 Dec. 5, 2024

(51) Int. Cl.
*B60W 60/00* (2020.01)

(52) U.S. Cl.
CPC ..... *B60W 60/0016* (2020.02); *B60W 2520/10* (2013.01); *B60W 2520/105* (2013.01)

(58) Field of Classification Search
CPC ......... B60W 60/0016; B60W 2520/10; B60W 2520/105
See application file for complete search history.

(56) References Cited

U.S. PATENT DOCUMENTS

| 10,671,075 | B1* | 6/2020 | Kobilarov | G05D 1/0088 |
| 10,976,743 | B2* | 4/2021 | Sheckells | B60W 30/10 |
| 2019/0025841 | A1 | 1/2019 | Haynes et al. | |
| 2019/0152490 | A1* | 5/2019 | Lan | B60W 30/0956 |
| 2020/0142417 | A1* | 5/2020 | Hudecek | B60W 30/0953 |
| 2020/0363806 | A1* | 11/2020 | Kobilarov | G06V 20/56 |
| 2021/0046924 | A1* | 2/2021 | Caldwell | B60W 30/09 |
| 2021/0373566 | A1* | 12/2021 | Agarwal | B60W 30/18145 |
| 2022/0412749 | A1 | 12/2022 | Yuki | |
| 2024/0125608 | A1* | 4/2024 | Andersen | G06N 3/0455 |
| 2024/0182082 | A1* | 6/2024 | Chen | B60W 60/0011 |
| 2024/0375672 | A1* | 11/2024 | Goldman-Shenhar | B60W 60/0011 |

FOREIGN PATENT DOCUMENTS

| CN | 114684200 A | * | 7/2022 | ......... B60W 60/001 |
| CN | 115123310 A | | 9/2022 | |
| EP | 4019899 A1 | | 6/2022 | |
| KR | 20200063039 A | | 6/2020 | |

OTHER PUBLICATIONS

Search Report and Written Opinion for International Application No. PCT/US2024/029322, Dated Sep. 3, 2024, 12 pages.

* cited by examiner

*Primary Examiner* — Justin S Lee
(74) *Attorney, Agent, or Firm* — Lee & Hayes, P.C.

(57) ABSTRACT

Techniques for predicting and avoiding collisions with objects detected in an environment of a vehicle are discussed herein. A vehicle computing device can implement a model that receives a set of potential reference trajectories for a vehicle to follow at a future time. The model can determine a tracking trajectory for the vehicle to follow while changing between a first reference trajectory and a second reference trajectory. The model may be implemented in connection with a parallel processing unit to determine points defining the tracking trajectory that represent spatial and temporal differences. The tracking trajectory can be used by the vehicle computing device for predicting vehicle actions by the vehicle computing device to control the vehicle.

20 Claims, 6 Drawing Sheets

INTERACTION PREDICTION BASED ON TRACKING TRAJECTORY

BACKGROUND

Planning systems in autonomous and semi-autonomous vehicles determine actions for a vehicle to take in an operating environment. Actions for a vehicle may be determined based in part on avoiding objects present in the environment. For example, an action may be generated by a planning system to yield to a pedestrian, to change a lane to avoid another vehicle in the road, or the like. Accurately predicting future actions may be necessary to safely operate the vehicle in the vicinity of the object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
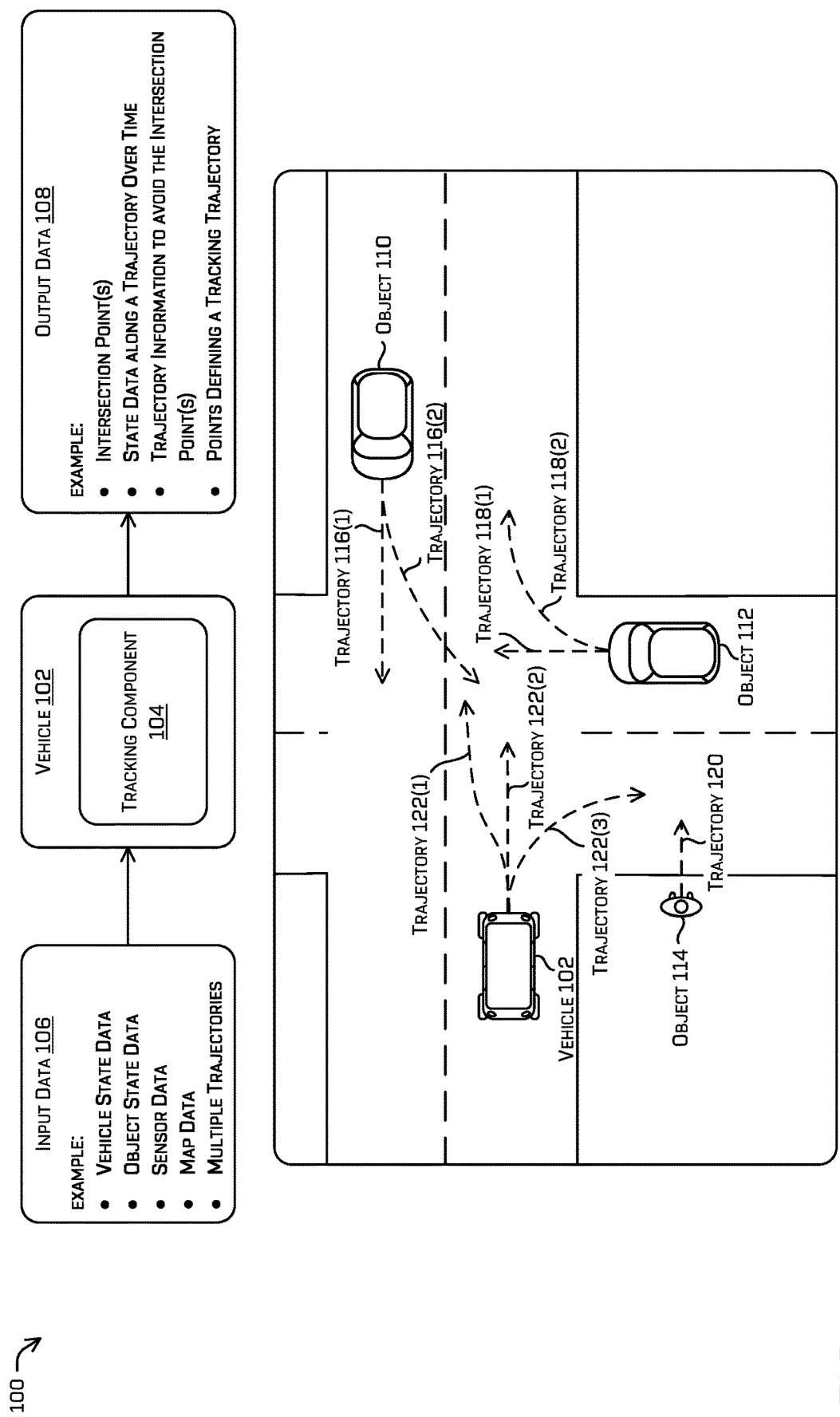
FIG. 1 is an illustration of an example environment, in which an example vehicle predicts a tracking trajectory to avoid a collision with one or more example objects.

Techniques for predicting and avoiding collisions with objects detected in an environment of a vehicle are discussed herein. The techniques can include a vehicle computing device that implements a model to receive a set of potential reference trajectories for a vehicle to follow at a future time. The model can determine a tracking trajectory that enables the vehicle to change from a first reference trajectory to a second reference trajectory while navigating in the environment. In some examples, the model can determine the tracking trajectory during a simulation to cause the vehicle to "transition" between the reference trajectories at any one or more points over a period of time associated with the simulation. For instance, the reference trajectories can be associated with different actions for the vehicle to follow, the trajectory being followed having the ability to change over time during the simulation. The model may be implemented in connection with a parallel processing unit to determine points defining the tracking trajectory at different points in space and time. By implementing the techniques described herein, a vehicle computing device can predict vehicle actions to control the vehicle with more accuracy and in less time, thereby improving the overall safety of the vehicle.

Generally, the model (e.g., tracking component) implemented by the vehicle computing device may provide functionality to determine interactions between a vehicle and one or more objects in an environment in the future. For example, responsive to determining that an interaction has occurred, the model can identify an available reference trajectory to avoid the intersection. However, the available reference trajectory may be associated with an area different from a current position of the vehicle. The model can, for example, generate a tracking trajectory to enable the vehicle to use the available reference trajectory prior to the intersection with the object(s). In various examples, the tracking trajectory can include an initial point on a first reference trajectory usable by the vehicle during a first time period of a simulation, and also include a second point on a second reference trajectory for the vehicle to avoid the object(s). The different reference trajectories may be associated with paths for the vehicle to follow including being associated with different lanes of travel. Accordingly, the tracking trajectory can enable the vehicle to transition to another available reference trajectory (e.g., a trajectory at least partially in another lane at the time of wanting to transition). The tracking trajectory can also or instead enable the vehicle to predict the intersections with more accuracy by considering space between the reference trajectories that would otherwise not be considered during vehicle planning operations. In some examples, the vehicle can be controlled in an environment based at least in part on the data output by the model.

The vehicle computing device can implement one or more components to perform planning operations as described herein. For example, a prediction component can determine one or more predicted trajectories associated with an object(s) in an environment. In some examples, a planning system may determine a number of potential actions (e.g., reference trajectories) associated with the vehicle. An environment can be simulated and predicted trajectories of object(s) and/or possible actions can be updated or otherwise adjusted to account for the potential interactions of the object(s) and/or vehicle, which can provide for more accurate predictions and simulations of objects in an environment. As a non-limiting example, an object's trajectory may be modified and/or propagated based at least in part on a control or action performed at a point in time given a particular action. As such, in various examples, the object's motion may be relative to a particular action.

In some examples, the model may determine which of multiple objects will reach an intersection point with the vehicle first based on object state data associated with each object and vehicle state data associated with the vehicle. For example, the model can receive the object state data (e.g., position data, orientation data, heading data, velocity data, speed data, acceleration data, yaw rate data, or turning rate data associated with the object) and/or the vehicle state data (e.g., position data, orientation data, heading data, velocity data, speed data, acceleration data, yaw rate data, or turning rate data associated with the vehicle) from a perception component of the vehicle that uses one or more sensors to detect and predict objects surrounding an environment (e.g., a simulated environment and/or a real-world environment) of the vehicle. In various examples, the model can receive sensor data, map data, or other input data and identify the interactions between two or more objects and/or interactions between an object and the vehicle. In examples of intersection(s) that are predicted between two objects, the model can identify the object that reaches an intersection point with the vehicle first based on dynamics, kinematics, and/or a grid, and predict actions for the vehicle (e.g., a steering action, an acceleration action, and the like) to avoid the object(s) most likely to interact with the vehicle.

In some examples, the techniques described herein can include implementing a model to determine a tracking trajectory usable by a vehicle computing device to control a vehicle (e.g., control steering, braking, acceleration, and so on). For instance, the vehicle computing device can receive tracking trajectory information from the model for use in planning operations, such as determining a candidate trajectory for the vehicle to use at a future time. In various examples, the vehicle may receive indications of potential intersection(s) with object(s) usable by the vehicle to quickly and/or preemptively avoid objects or update predicted trajectories of objects, thereby improving safety of the vehicle. Further, aspects of the processing operations may be parallelized and input to a parallel processor unit (such as a GPU) for efficient processing. Accordingly, implementing the techniques described herein can efficiently make use of available computational resources (e.g., memory and/or processor allocation or usage) while also improving accuracy of predictions.

In various examples, the model may determine that an object intersects with a first reference trajectory (e.g., received from a planner component), and identify a second reference trajectory for the vehicle to use to avoid the object. For instance, the vehicle computing device can initiate a simulation between the vehicle and an object, and determine during the simulation to change to another reference trajectory from among a set of reference trajectories received as input. The model can determine a tracking trajectory to connect a current position of the vehicle to the identified reference trajectory. Points defining the tracking trajectory can include an initial point (e.g., a point on a current reference trajectory) at a first end and a convergence point at a second end which represents a length along the identified reference trajectory at which the vehicle is able to start following the identified reference trajectory. The tracking trajectory can also include one more points between the initial point and the convergence point that represent different potential states of the vehicle from a first time to a second time. In various examples, the model can determine at least some of the points in parallel by one or more GPUs despite the points being associated with different times. Additional details for determining a tracking trajectory are described herein, including in relation to FIGS. 2 and 3.

In some examples, the vehicle may comprise an autonomous or semi-autonomous vehicle with a vehicle computing device configured to receive sensor data from one or more sensors of the vehicle. The vehicle may detect objects using one or more sensors while navigating in the environment. The objects may include static objects (e.g., ground level, buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be used to determine input data usable by the model to predict an intersection probability associated with the object and/or one or more tracking trajectories.

In some examples, the tracking trajectory output by the model can undergo further processing (e.g., to provide a modified trajectory for the vehicle to follow). For example, one or more points of the tracking trajectory can be removed or relocated to change a shape of the tracking trajectory. Whether updated of not, the vehicle computing device can use the tracking trajectory in a variety of ways including to generate a candidate trajectory for the vehicle to navigate in a real-world environment. Additionally, or alternatively, the vehicle computing device can identify a more accurate intersection prediction by considering areas along the tracking trajectory as possible locations for an object to intersect (e.g., an intersection can be associated with the identified reference trajectory but actually occur sooner using the tracking trajectory).

In various examples, the model can determine a tracking trajectory(ies) by implementing processing in a parallel processor unit such as in parallel by a GPU and/or in parallel by multiple GPUs. By implementing the parallel processor unit, the model can more efficiently process input data to generate points that define the tracking trajectory in real-time. Given that each point on the tracking trajectory is associated with a different time, defining a point of the tracking trajectory depends on a position of a previous point, or other information associated with the point such as a state data of the vehicle and/or the object. Using the techniques described herein, a parallel processor unit can generate the points that define the tracking trajectory at substantially a same time thereby saving computations resource that would otherwise be used to determine the points sequentially.

In some examples, a model may define processing resources (e.g., processor amount, processor cycles, processor cores, processor location, processor type, and the like) to use to predict intersection probabilities associated with a potential intersection with the vehicle and/or the tracking trajectory (or points thereof). A vehicle computing device can implement a model that may have different processors (e.g., Central Processing Units (CPUs), Graphics Processing Units (GPUs), multi-core processor, and the like). Models may define processing resources to utilize a processor that most efficiently (e.g., uses the least amount of computational time) outputs a prediction. In some examples, models may generate a tracking trajectory by processing data associated with the object and/or the vehicle using a GPU, CPU, or a combination thereof. In this way, the model may be defined to utilize the processing resources that enable the model to perform predictions in the least amount of time (e.g., to use the tracking trajectory in planning considerations of the vehicle). Accordingly, a model may make the best use of available processing resources and enable more predictions that may improve how a vehicle navigates in relation to the objects.

A tracking trajectory can, for instance, include an orientation (e.g., yaw, pitch, and/or roll), velocity, steering controls, and/or acceleration for the vehicle to navigate in an environment. In some examples, the tracking trajectory can include points to represent a position of the vehicle at different times along the tracking trajectory. Accordingly, the tracking trajectory can represent temporal features and spatial features.

As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a mathematical (e.g., statistical, function, etc.) model that is representative of logic and/or mathematical functions that generate approximations which are usable to make predictions.

The techniques discussed herein can improve a functioning of a computing device of a vehicle in a number of ways. For example, the model may identify which objects to process in an environment to prevent unneeded actions by the vehicle, and/or improves predictions related to the behavior of the vehicle. In some examples, the model improves functioning and safety of the vehicle by preventing the vehicle from taking additional actions that are not required based on conditions in the environment around the vehicle. In addition, the techniques described herein can improve passenger comfort and/or vehicle safety such as, for example, avoiding sudden braking or swerving when not needed. The techniques can include the model optimizing available computational resources by performing operations that limit the impact on the available resources (as compared to not implementing the model). Utilizing output data from the model by a vehicle computing device, for instance, can improve the accuracy and/or reduce a latency for the vehicle to respond to a potential collision in the environment.

In various examples, implementing the model can improve safety of a vehicle by outputting one or more tracking trajectories for consideration during planning operations. For example, a candidate trajectory determined for the vehicle can be based at least in part on consideration of the tracking trajectory. By implementing the model, consideration to a trajectory to track to a reference trajectory, and potential actions by each object and/or potential actions by the vehicle over time in a simulation, can be determined in substantially real-time before a safest possible route is determined for the vehicle to follow.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is an illustration of an example environment 100, in which an example vehicle predicts a tracking trajectory to avoid a collision with one or more example objects. For instance, an autonomous vehicle (vehicle 102) in the environment 100 can include an example prediction model (tracking component 104) that is configured to receive input data 106 and determine output data 108. A vehicle computing device (e.g., vehicle computing device 404) and/or a remote computing device (e.g., computing device(s) 436) may implement the tracking component 104 of the vehicle 102. While described as a separate system, in some examples, prediction techniques described herein may be implemented by other vehicle systems, components, and/or computing devices. For example, and as will be described in further detail with regard to FIG. 4, the intersection prediction techniques described herein may be implemented at least partially by or in association with a localization component 420, a perception component 422, a prediction component 424, and/or a planning component 426.

In some examples, the input data 106 can comprise one or more of: predicted vehicle trajectories, predicted object trajectory(ies), vehicle state data, object state data, sensor data, log data, and/or map data, among others. For instance, the tracking component 104 can receive the input data 106 (e.g., the predicted vehicle trajectories, one or more predicted object vehicle trajectories, an object position, a vehicle position, and so on) and generate the output data 108 comprising one or more of an intersection point(s) between the object(s)s and the vehicle, state data along a trajectory over time, a vehicle trajectory to avoid the intersection point(s), points defining a tracking trajectory that "connects" two predicted vehicle trajectories, etc. In some examples, the tracking component 104 may receive input data representing vehicle state data (e.g., position data, orientation data, heading data, velocity data, speed data, acceleration data, yaw rate data, or turning rate data associated with the vehicle) object state data (e.g., position data, orientation data, heading data, velocity data, speed data, acceleration data, yaw rate data, or turning rate data associated with the object), and/or sensor data from one or more sensors.

In various examples, the tracking component 104 can determine the output data 108 while the vehicle 102 navigates in the environment 100. For example, the output data 108 may represent a future state(s) of one or more objects or the vehicle 102 for different times in the future as the vehicle 102 navigates to a destination in the environment 100. In various examples, the tracking component 104 can receive the input data 106 from one or more components of the vehicle computing device and/or computing device(s) remote from the vehicle 102 and may determine actions associated with one of multiple potential trajectories associated with the input data 106.

In various examples, the vehicle computing device associated with the tracking component 104 may be configured to receive sensor data representing object(s) of the environment 100, such as via a perception component (e.g., the perception component 422). In some examples, the vehicle computing device may detect, infer, estimate, or otherwise determine object state data representing characteristics of the object in the environment 100. For example, such object state data may comprise position, velocity, acceleration, size, semantic type, etc. In some examples, the sensor(s) may include sensors mounted on the vehicle 102, and may include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example, sensors mounted on another autonomous vehicle, and/or sensors mounted in the environment 100. In various examples, the vehicle 102 may be configured to transmit and/or receive data from other autonomous vehicles. The data may include sensor data and/or state data, such as sensor data associated with the environment 100.

In various examples, the tracking component 104 can receive map data representing static features of the environment 100 (which, in at least some examples, may also comprise designations for lane markings, lane speed, road control information—e.g., stop signs, traffic signals, crosswalks, school zones, speed bumps, and the like). The map data can be received from one or more components of a vehicle computing device or remote computing device (e.g., a computing device associated with an autonomous vehicle in a fleet of vehicles or other computing device remote from the vehicle 102).

In some examples, the vehicle computing device may be configured to detect an object in the environment 100, such as object 110 and object 112 (e.g., a vehicle), and object 114 (e.g., a pedestrian), just to name a few. In some examples, the vehicle computing device may be configured to receive, detect, infer, estimate, or otherwise determine one or more trajectories (e.g., direction, speed, acceleration, etc.) for the vehicle and each detected object. As shown in FIG. 1, the object 110 is associated with object trajectories 116(1) and 116(2), the object 112 is associated with object trajectories 118(1) and 118(2), the object 114 is associated with an object trajectory 120, and the vehicle 102 is associated with the vehicle trajectories 122(1), 122(2), and 122(3) determined by the vehicle computing device (e.g., using the perception component 422, the prediction component 424, or another model). In some examples, the tracking component 104 may receive path information associated with the aforementioned object trajectories (e.g., 116(1), 116(2), 118(1), 118(2), 120, 122(1), 122(2), and 122(3)) from a machine learned model. Though FIG. 1 shows one or two trajectories associated with the various objects, any number of objects may be detected and any number of object trajectories may be predicted for each object.

In some examples, the tracking component 104 may determine potential intersection points for one or more paths (e.g., the object trajectories 118(1) and 118(2) or other object trajectory) associated with the object 112 (also referred to as the vehicle 112). In such examples, the intersection point(s) output by the tracking component 104 may indicate a potential intersection between the vehicle 112 and the vehicle 102 at an intersection point. Further description of determining potential intersections is described in connection with FIG. 2 and throughout the disclosure.

In various examples, a tree search can be used to determine which of the available vehicle trajectories to employ at a particular time so that an action by the vehicle can be updated based on potential intersections. For instance, based on an indication of an intersection point the tracking component 104 can define points between a first vehicle trajectory and a second vehicle trajectory (also referred to herein as reference trajectories) to enable the vehicle 102 utilize an available vehicle trajectory to avoid the vehicle 112. Collectively, the point can be thought of as providing a tracking trajectory for the vehicle to transition from a first vehicle trajectory to a second vehicle trajectory. In various examples, tracking component 104 can define the points while performing a simulation. The points can be defined, for example, based on vehicle state data associated with the vehicle trajectory that the vehicle 102 is currently using and/or will use at a future time (after transitioning using the tracking trajectory). As a non-limiting example, reference trajectories may be defined by a uniform spacing of a set of control points (or waypoints) either in time and/or in space.

In various examples, the points defined by the tracking component 104 can include an initial point, a convergence point, and multiple points between the initial point and the convergence point. The initial point can represent a point prior to intersection point at which the vehicle 102 uses a current vehicle trajectory, such as the vehicle trajectory 122(2). The convergence point can represent a point along another vehicle trajectory, such as the vehicle trajectory 122(1). The multiple points can for example, represent different states for the vehicle 102 at different points in time (e.g., a point can be associated with both time and space). The tracking component 104 can define at least some of the points using a parallel processor unit. Further description of the tracking component 104 determining points for a tracking trajectory are described in FIG. 3, and elsewhere.

In some examples, the tracking component 104 may determine a vehicle state and/or an object state at different times in the future. The tracking component 104 may determine an action for the vehicle 110, the vehicle 112, the pedestrian 114, and/or the vehicle 102 during simulation. For example, actions (e.g., a steering action, a braking action, an acceleration action, and so on) can be determined for a time period during a simulation (e.g., each second during a four second simulation). In various examples, the tracking component 104 may select, determine, or otherwise predict a vehicle trajectory that the vehicle 102 may use to navigate in the environment 100 relative to one or more paths (e.g., the object trajectories 118(1) and 118(2) associated with the vehicle 112). In various examples, the output data 108 can include a tracking trajectory for use during planning operations to cause the vehicle 102 to avoid the vehicle 112. To implement the vehicle actions the vehicle 102 can utilize a tracking trajectory comprising the defined points as described herein.

In some examples, the vehicle computing device may control the vehicle 102 in the environment based at least in part on the output data 108 (e.g., determine a candidate trajectory to avoid the objects in the environment). For instance, the tracking component 104 may provide functionality to identify objects most likely to cause an intersection and communicate intersection information about the identified objects to other components of the vehicle computing device and/or a tracking trajectory. Accordingly, potential intersections (e.g., a probability or likelihood of an intersection between object(s) and the vehicle) and/or the tracking trajectories may be taken into account in operations (e.g., simulations, estimated states, interaction modeling, collision estimation, etc.) or other vehicle control planning operation (e.g., as determined by a planning component) to quickly and/or preemptively avoid objects, thereby improving safety of the vehicle. Additional detail for determining and utilizing the output data 108 are discussed throughout this disclosure. Additional details of performing simulations and/or generating trajectories are described in U.S. patent application Ser. No. 15/632,147, filed on Jun. 23, 2017, entitled "Trajectory Generation Using Temporal Logic and Tree Search," and U.S. patent application Ser. No. 15/843,512, filed on Dec. 15, 2017, entitled "Trajectory Generation Using Curvature Segments," which are incorporated herein by reference in their entirety and for all purposes.

The output data 108 from the tracking component 104 can be used by a vehicle computing device in a variety of ways. For instance, the tracking component 104 can generate a signal indicating information about the output data 108 (e.g., the tracking trajectory) for transmitting to a planning component (e.g., planning component 426) of the vehicle computing device to control the vehicle 102 in the environment 100 (e.g., determine a vehicle trajectory and/or control a propulsion system, a braking system, or a steering system).

A training component of a remote computing device, such as the training component 450 of the computing device(s) 436 and/or the vehicle computing device 404 may be implemented to train the tracking component 104. Training data may include a wide variety of data, such as image data, video data, lidar data, radar data, audio data, other sensor data, etc., that is associated with a known or desired value (e.g., a desired classification, inference, prediction, etc.). Such values may generally be referred to as a "ground truth." To illustrate, the training data may be used for image classification and, as such, may include an image of an environment that is captured by an autonomous vehicle and that is associated with one or more classifications. In some examples, such a classification may be based on user input (e.g., user input indicating that the image depicts a specific type of object) or may be based on the output of another machine learned model. In some examples, such labeled classifications (or more generally, the labeled output associated with training data) may be referred to as ground truth.

Figure 2:
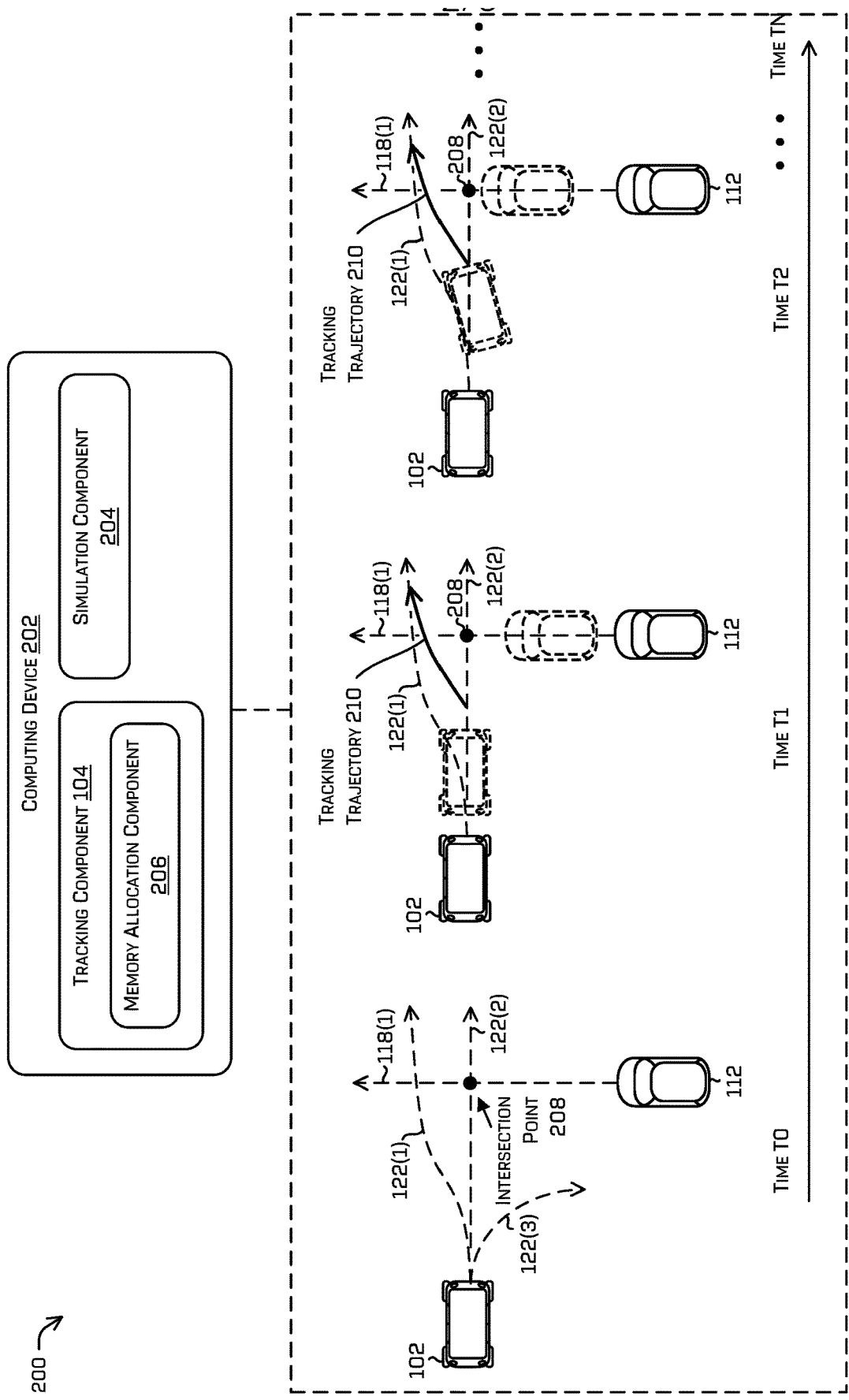
FIG. 2 is an illustration of another example environment in which an example computing device determines a tracking trajectory during simulation between one or more objects and a vehicle.

FIG. 2 is an illustration of another example environment 200 in which an example computing device determines a tracking trajectory during a simulation between one or more objects and a vehicle. For instance, a computing device 202 can implement the tracking component 104 and/or a simulation component 204 to determine the output data 108 representing a tracking trajectory to avoid potential interactions (e.g., intersections or near-intersections (e.g., within a threshold distance)) between one or more objects (e.g., the object 110, the object 112, and/or the object 114) and the vehicle 102. In some examples, the computing device 202 may be associated with the vehicle computing device(s) 404 and/or the computing device(s) 436.

In some examples, the simulation component 204 can simulate possible actions for the vehicle and/or objects over time. For instance, if a vehicle takes a first action at a first time, such as 100 milliseconds (ms) into the simulation, the simulation component 204 can determine a second action for the vehicle based on the first action taken by the vehicle. In this way, the simulation component 204 can provide functionality to consider possible actions at each instance of the simulation (e.g., over 4 seconds) similar to how a driver makes decisions when operating a vehicle. In some examples, the simulation component 204 can determine actions for both the vehicle 102 and the object 112 that are dependent upon previous actions as time increases during the simulation. As a non-limiting example, estimated object states (positions, velocities, headings, accelerations, etc.) may be propagated in time based at least in part on a command or action taken at a point in time by the vehicle.

As shown in FIG. 2 the tracking component 104 comprises a memory allocation component 206. In various examples, the memory allocation component 206 can include functionality to allocate the input data 106 in one or more memories associated with the computing device 202. In various examples, allocating or assigning data in memory comprises the memory allocation component 206 determining a location or portion of the memory for efficient processing of the input data 106. In this way, a processor (e.g., one or more GPUs) of the computing device 202 can efficiently process the input data 106 during generation of the output data 108. In some examples, the memory allocation component 206 allocates the input data 106 to a parallel processor unit (e.g., a CPU, GPU, or the like capable of processing input data at substantially a same time).

For example, the simulation component 204 can process the trajectories 122(1), 122(2), and 122(3) associated with the vehicle 102 and the trajectories 118(1), and 118(2) associated with the object 112. In some examples additional object trajectories up to 118(N) (where N is an integer greater than 1) can also be included. In some examples, the trajectory 122(1), 122(2), and 122(3) can be associated with an action to change lanes or turn to the left (relative to the vehicle 102), travel straight, and change lanes or turn to the right, respectively. In some examples, the trajectory 118(1) can be associated with a first velocity and the trajectory 118(2) can be associated with a second velocity less than the first velocity. Although three trajectories for the vehicle 102 are illustrated and three trajectories for the object 112 are illustrated, any number of type of actions and/or trajectories can be determined or received by the tracking component 104. Further, although FIG. 2 illustrates interactions between the vehicle 102 and the object 112, the techniques can include determining interactions (e.g., an interaction point(s)) between two objects.

Additionally or alternatively, in various examples, the simulation component 204 can simulate potential interactions between the vehicle 110, the vehicle 112, and the pedestrian 114, just to name a few. In various examples, a plurality of combinations of potential intersections can be determined between a first set of trajectories and a second set of trajectories associated with object(s) and/or the vehicle.

For example, the tracking component 104 can determine intersection points at which the objects (e.g., the object 110, the object 112, and/or the object 114) may interact with the vehicle 102. For instance, FIG. 2 depicts the trajectory 118(1) intersecting with the vehicle trajectory 122(2) at an intersection point 208. In some examples, the potential intersection point can be determined for the object trajectory 118(1), and/or for other objects and the associated trajectory(ies) therewith.

In such examples, the tracking component 104 can process the object trajectories associated with the potential intersection point(s). In other examples, the object trajectories associated with intersection points most likely to interact with the vehicle 102 first can be selected by the tracking component 104 for further processing. In some examples, the tracking component 104 can make an initial determination that an interaction is likely not possible, thereby saving computational resources from processing additional detail (e.g., performing a simulation, determining an estimated state of an object or the vehicle, and so on) associated with the aforementioned intersections. In various examples, the tracking component 104 can determine that the vehicle 102 follow the trajectory 122(1) to avoid the intersection point 208. In some examples, the vehicle 102 can follow the trajectory 122(2) for a period of time before identifying for the vehicle 102 to use the trajectory 122(1).

As illustrated in FIG. 2, the simulation component 204 can predict scenarios at times T0, T1, . . . TN (where N is an integer greater than 1) indicative of future states (e.g., estimated states) of the environment. For example, sensor data associated with the vehicle 102 can be used to perform the scenarios to identify potential objects that may intersect with the vehicle 102 at different times in the future. For instance, the simulation component 204 can implement a decision tree having branches corresponding to different vehicle trajectories (e.g., the trajectory 122(1), the trajectory 122(2), the trajectory 122(3), etc.), and a search of the decision tree can occur every 100 ms (or other interval) identifying one of the vehicle trajectories that is safest for operation in the environment 100. In this way, the vehicle 102 can change or switch from a current trajectory to one of a set of available trajectories to avoid the intersection point 208. However, depending on a position of the vehicle 102 along the current trajectory (e.g., the trajectory 122(2)), the vehicle 102 may not be able to immediately use the alternate trajectory due to a difference between the position of the vehicle 102 and a position of a point along the trajectory 122(1). Accordingly, the tracking component 104 can generate a tracking trajectory 210 that enables the vehicle 102 to transition from the trajectory 122(2) to the trajectory 122(1), or otherwise link the two trajectories.

As shown in FIG. 2, as time changes from time T0 to time T1, the vehicle 112 and the vehicle 102 are approaching one another. At time T1, the simulation component 204 can determine the vehicle 102 should follow the trajectory 122(1) based at least in part on predicting the intersection point 208. At time T2, the simulation component 204 can continue the simulation with the vehicle 102 following the tracking trajectory 210.

As further explained in FIG. 2 and elsewhere, the tracking trajectory 210 can include a first end representing an initial point along the current trajectory such as the trajectory 122(2), and a second end representing a convergence point along a destination trajectory (e.g., the trajectory 122(1)).

In various examples, one or more of: the vehicle trajectories 122(1), 122(2), 122(3) and/or the object trajectories (e.g., the trajectories 116(1), 116(2), 118(1), 118(2) . . . 118(N), and 120) may represent a "corridor" as opposed to a line shown in FIG. 2. For example, any of the trajectories as described herein may represent an area of the environment 200 that may be occupied by the vehicle and/or the object as the vehicle traverses the environment.

In some examples, the tracking component 104 can determine whether two objects (e.g., the vehicle 110 and the vehicle 112) may intersect with a same vehicle trajectory, and identify or determine which of the two objects (or object trajectories associated therewith) to process with the simulation component based at least in part on a control policy associated with rules of the road, right of way logic, physics, kinematics, dynamics, and the like. In this way, computational resources can be omitted with respect to, for example, processing data associated with scenarios in which the object reaches an intersection point with the vehicle 102 after another object. That is, the simulation component 204 can select one or more of the object trajectories (e.g., the trajectories 116(1), 116(2), 118(1), 118(2), and 120) for further processing based at least in part on which of the trajectories reach a respective intersection point with the vehicle 102 first. In various examples, the simulation component 204 can select a trajectory from among multiple trajectories based at least in part on a tree search comprising logic to identify which of the objects takes priority for potentially interacting with the vehicle.

Figure 3:
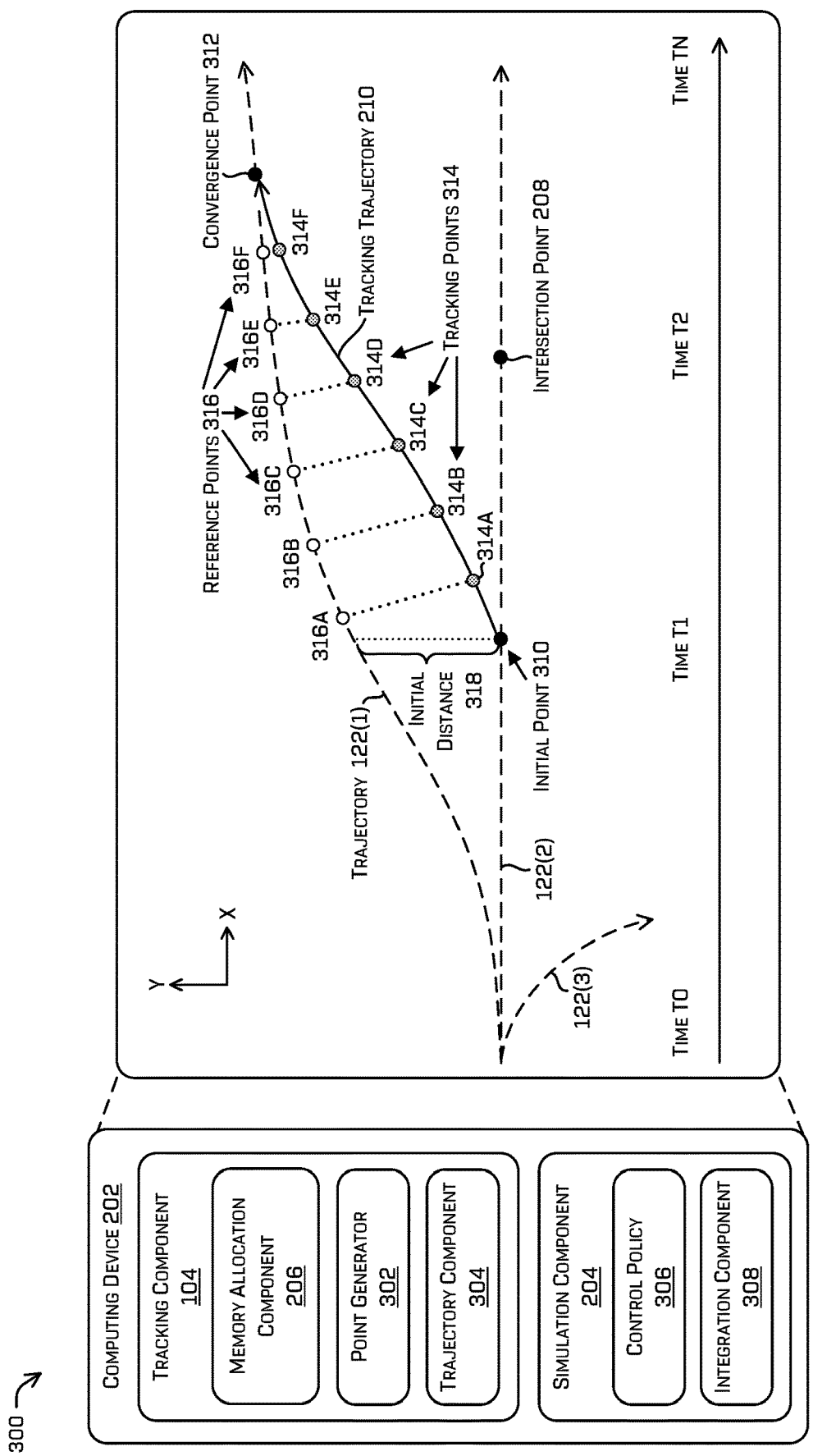
FIG. 3 is an illustration of an example tracking component determining points that define an example tracking trajectory.

In some examples, a tree search can determine potential interactions between object trajectories of different objects and/or object trajectories and vehicle trajectories, and the potential interactions determined by the tree search can be used in a simulation, as further described in FIG. 3 and elsewhere. In various examples, the tree search can identify potential interactions over time to reduce a number of potential interactions for a later time (e.g., at each second or other time interval the tree search can determine a most likely interaction between object(s) and the vehicle). In some examples, vehicle actions (e.g., reference trajectories) can be explored as various branches of a tree search and tree branches can be pruned or ignored if a cost associated with an action meets or exceeds a threshold cost. As a non-limiting example, one or more actions may be contemplated at discrete steps in the future (e.g., at fixed time, distance intervals, or some other event-based step). In such an example, the tree may branch at such discrete points based on differing actions that the vehicle could take at those points and the methods described herein may be used in selecting between those branches when expanding the tree. For instance, branches may be explored having the lowest cost and/or in which there is no adverse event (e.g., collision, uncomfortable control, etc.).

FIG. 3 is a block diagram 300 of an example tracking component determining points that define an example tracking trajectory. For instance, the computing device 202 can implement the tracking component 104 to determine the output data 108 representing the tracking trajectory 210. In some examples, the computing device 202 may be associated with the vehicle computing device(s) 404 and/or the computing device(s) 436.

FIG. 3 depicts the tracking component 104 comprising a point generator 302 and a trajectory component 304, and further depicts the simulation component 204 comprising a control policy 306 and an integration component 308.

In some examples, the point generator 302 can provide functionality to generate points usable for defining or otherwise determining the tracking trajectory 210. For example, points of the tracking trajectory 210 can include an initial point 310 at a first end, a convergence point 312 at a second end, and tracking points 314 (e.g., a tracking point 314A, a tracking point 314B, a tracking point 314C, a tracking point 314D, a tracking point 314E, a tracking point 314F) between the initial point 310 and the convergence point 312. The point generator 302 can also or instead determine reference points 316 (e.g., a reference point 316A, a reference point 316B, a reference point 316C, a reference point 316D, a reference point 316E, a reference point 316F) along the trajectory 122(1) usable to ascertain the tracking points 314. In various examples, the point generator 302 can determine at least some of the points (e.g., the initial point 310, the convergence point 312, and/or the tracking points 314) in parallel by one or more processors even when the points output by the parallel processor(s) are associated with different times in the future.

The trajectory component 304 can represent functionality to determine one or more tracking trajectories (e.g., the tracking trajectory 210) based at least in part on receiving data representing different points as input. The trajectory component 304 can, for example, receive data representing one or more of the initial point 310, the convergence point 312, or the tracking points 314 as input, and apply an algorithm that generates a curve by connecting the points. In some examples, the tracking trajectory 210 can be determined based at least in part on the trajectory component 304 applying a tracking algorithm, which may define the tracking trajectory as a function of lateral error from the reference trajectory to be joined. In some examples, the function may be defined as a polynomial equation (e.g., a third order, fifth order, or otherwise), an exponential equation, a trigonometric equation, a linear equation, a non-linear equation, a sigmoid function, or any other function or combination thereof. In at least some examples, the function is smooth enough to be within lateral and/or longitudinal constraints, as well as being differentiable one or two times.

In some examples, the function comprises a polynomial function and/or an exponential function having parameters that cause an output of the function to vary smoothly with respect to an arclength along a reference trajectory (e.g., the target trajectory). For example, the function may be considered "a smooth function" in part for being differential up to or more two times. In other words, the function may be twice differentiable for solving, and the output of the function can be compared to a threshold value to ensure that a curvature of the output is not too high (kinematically unfollowable by the vehicle).

By way of example and not limitation, the point generator 302 can determine an initial point 310 occurring prior to the intersection point 208, and corresponding to an initial distance 318 from the trajectory 122(1). The initial distance 318 can, for example, represent a distance from a target trajectory (trajectory 122(1)) from a point along the current trajectory (trajectory 122(2)). The initial distance 318 can be thought of as a lateral "error" between a current location of the vehicle 102 along the trajectory 122(2) and a corresponding location along the target trajectory 122(1) at a same time. Based at least in part on the magnitude of the initial distance 318, the point generator 302 can determine the convergence point 312 representing a distance along the trajectory 122(1) at which the vehicle 102 is able to follow the trajectory 122(1). In some examples, the initial distance 318 can be a distance that is perpendicular from the trajectory 122(1) to the tracking trajectory 210.

Generally, the initial point 310, the convergence point 312, the tracking points 314, and/or the reference points 316 can be associated with vehicle state data for the vehicle 102 traversing a reference trajectory (here, trajectory 122(1)). In various examples, state data associated with the vehicle 102 and/or the object(s) can be used by one or more components to generate an output, such as the tracking component 104 determining an aforementioned point or trajectory.

As a non-limiting example, a location of the tracking points 314 may be determined for each of the reference points 316 that define the reference trajectory using the above referenced function (e.g., by determining a projection from the reference point 316 to a tracking point 314 based at least on the function). Additionally, or alternatively, a longitudinal "error" may be determined based at least in part on a velocity associated with each tracking point 314 such that a velocity associated with the tracking trajectory gradually converges from a velocity associated with the reference trajectory 122(2) at initial point 310 to within a threshold of the velocity indicated by the reference trajectory at the convergence point 312. Such velocity error may be based at least in part on a same, similar, or differing function from that for the lateral error (e.g., offset distance between a reference point 316 and the tracking point 314). In some examples, the lateral error can represent a perpendicular distance from a reference point (e.g., the reference point 316A) to a corresponding tracking point (e.g., the tracking point 314A). With respect to either the lateral and/or longitudinal errors, the function (e.g., polynomial) may be defined to ensure the initial points matches a heading, offset, and/or other state of the vehicle at the initial point 310 and the desired state indicated by the reference trajectory 122(1) at the convergence point 312.

Given that the error determination is independent for a one of the tracking points 314 is independent of another of the tracking points 314, the operations may be parallelized such that all are computed substantially simultaneously (e.g., within computational limits). Determination of positions and/or velocities of the tracking points 314 (or other states) may be performed simultaneously and/or sequentially (e.g., determining a position first and then a velocity).

In some examples, once the tracking points 314 are determined, an interpolation may be performed such that the points are distributed uniformly spatially and/or temporally along the tracking trajectory. In some examples, the interpolation can include performing upsampling or downsampling of the tracking points 314 to cause points along to the tracking trajectory 210 to be modified.

The point generator 302 can, in various examples, determine a heading error between a first heading associated with a current vehicle trajectory and a second heading associated with a target trajectory. For example, the point generator 302 can determine the first heading (e.g., orientation) for the vehicle at a point along the trajectory 122(2) at a given time, such as a time corresponding to the initial point 310. The point generator 302 can determine the second heading at a point of the trajectory 122(1) corresponding to a same time as the trajectory 122(2), and further determine a difference between the first heading and the second heading. In various examples, the point generator 302 can determine the convergence point 312 based at least in part on a magnitude of the difference in headings (e.g., a relatively larger difference can result in a further convergence point than a relatively smaller difference). In some examples, the point generator 302 can compare the difference in the first heading and the second heading to a heading threshold, and in examples when the difference meets or exceeds the heading threshold, determine to use the heading information for determining a position of the convergence point 312. In examples when the difference is less than the heading threshold, the point generator 302 can determine the convergence point 312 with or without consideration to the heading information of the various trajectories. In some examples, the point generator 302 can determine the initial point 310 based at least in part on the vehicle state data such as a position, a velocity, and/or an acceleration of the vehicle 102 associated with the trajectory 122(2). The point generator 302 can determine the convergence point 312 based at least in part on the vehicle state data such and the initial point 310. For instance, based on the velocity of vehicle 102, the tracking trajectory 210 can determine a position of the initial point 310 and/or the convergence point 312 to enable the vehicle 102 to smoothly transition to the trajectory 122(1). In some examples, dynamics and/or kinematics of the vehicle 102 can be considered by the point generator 302 when determining the initial point 310, the convergence point 312, and/or other points as described herein. Further, the point generator 302 can determine a position of the initial point 310 and a position of the convergence point 312 that enables the vehicle 102 to gradually transition to using a velocity of the target trajectory (e.g., is kinematically feasible).

The point generator 302 can, for example, determine the convergence point 312 based at least in part on a magnitude of the initial distance 318 (e.g., a value indicating an error between a point along the trajectory 122(1) and a corresponding point in time along the trajectory 122(2)), the vehicle state data, a position of the initial point 310, and/or vehicle state data associated with the initial point 310. In some examples, the convergence point 312 can be determined based at least in part on an acceleration of the vehicle 102 at the initial point 310 and an acceleration for the vehicle 102 to follow at the convergence point 312 (e.g., related to the trajectory 122(1)). Though discussed in relation to acceleration in this example, any vehicle state data (e.g., position data, orientation data, heading data, velocity data, speed data, acceleration data, yaw rate data, or turning rate data) can be used including state data from various times.

As mentioned, the tracking points 314 and the reference points 316 can be associated with different state data such as vehicle state data describing a state of the vehicle 102 at a particular point in time. For instance, the point generator 302 can receive vehicle state data and/or object state data from another component of the computing device 202 that is usable for determining an output. In some examples, the reference points 316 can correspond to a state at a point in time such as a point in a node and/or between nodes of a decision tree used to determine the preferred reference trajectory at various points in time.

In some examples, the tracking points 314 can be determined based at least in part on an offset distance from a corresponding reference point of the reference points 316 (the reference trajectory to be tracked to). For example, the reference point 316A can be associated with vehicle state data such as a heading, a velocity, an acceleration, etc., and the point generator 302 can define the tracking point 314A (an state data associated therewith) based at least in part on the vehicle state data of the corresponding reference point 316A and the corresponding error function. In a similar way, vehicle state data for each reference point can be used to determine a tracking point for a same time.

The trajectory component 304 can determine the tracking trajectory 210 based at least in part on applying a heuristic, rule, and/or mathematical algorithm to the initial point 310, the tracking points 314, and the convergence point 312. In some examples, a polynomial equation can arrange the points with consideration to vehicle dynamics to generate the target trajectory 210 for safety and passenger comfort. In some examples, one or more of the tracking points 314 can be determined based at least in part on a lateral distance of the tracking point relative to a reference point. For example, point generator 302 can determine a position of the tracking point 314D based on the lateral distance from the reference point 316D.

By way of example and not limitation, the point generator 302 may determine the tracking point 314A by estimating an offset distance from the reference point 316A. Positions associated with the other tracking points can be determined based at least in part on an interpolation of the offset distance from the reference point 316A. In some examples, each of the tracking points 314 can be determined by a parallel processing unit at substantially a same time by assigning a thread equal to or corresponding to the reference points 316.

The point generator 302 may, in various examples, determine a position of a tracking point 314 based at least in part on an offset from a position of the reference point along the trajectory 122(1). The position can represent a location in three-dimensional or two-dimensional space such as an X, Y coordinate. In some examples, the tracking points 314 can include a first coordinate determined based on a lateral offset, such as the initial distance 318, and further determined based on a velocity estimate of the vehicle 102 for a particular time. The trajectory component 304 can, for example, determine the tracking trajectory 210 by applying an algorithm to gradually reduce the initial distance 318 over time.

In various examples, a magnitude of the initial distance 318 can be compared to a threshold value to determine an action that improves the effectiveness of the tracking trajectory 210. For example, the trajectory 122(2) may be associated with a different lane than the trajectory 122(1) and the initial distance 318 can, in such examples, be considered when determining a curvature of the tracking trajectory 210. In examples when the initial distance meets or exceeds the threshold value, the action can include adding, removing, or relocating a point of the tracking trajectory 210. In examples when the initial distance is less than the threshold value, the action can include using the tracking trajectory with current points unchanged (relative to the above example).

As shown in FIG. 3, the initial point 310 is not aligned with a corresponding reference point of the trajectory 122(1). In such examples, state data associated with the initial point 310 can include state data corresponding to a point in time along the trajectory 122(2). However, in other examples, a reference point may correspond to a position of the initial point 310, depending on an interval for searching a node in a decision tree, or other reasons.

In some examples, the trajectory component 304 can output the tracking trajectory 210 and perform post-processing including refining, smoothing, or otherwise modifying a shape of the tracking trajectory 210 to output an updated or modified tracking trajectory. In such examples, the updated tracking trajectory can include a different number of tracking points 314 (e.g., a tracking point can be or added) and/or a different position of one or more of the tracking points 314. In various examples, the updated tracking trajectory can represent a sampling (e.g., interpolation) of the tracking points 314 to cause at least some points to change position for a more uniform overall distribution, though the tracking trajectory 210 may also be used without requiring post-processing. In some examples, one or more tracking points 314 can be removed to achieve a uniform distribution. For instance, arclength information for different tracking points along the trajectory can be compared to a threshold and points meeting or exceeding the threshold can be removed as part of the tracking trajectory 210.

As mentioned, in various examples, the simulation component 204 can simulate possible actions for the vehicle 102 and/or objects over time. For instance, if a vehicle takes a first action at a first time, such as 1 second into the simulation, the simulation component 204 can determine a second action for the vehicle based on the first action taken by the vehicle. As another example, the simulation component 204 can employ a decision tree that includes nodes every 100 ms at which an output branch corresponding to one of the vehicle trajectories.

The control policy 306 can comprise one or more of a physics policy, a dynamics policy, a kinematics policy, and/or a rules policy indicating how the vehicle and objects can potentially interact or indicating information about rules of the road such as a right of way associated with a roadway, an intersection, or a navigable surface. In some examples, the tracking component 104 can implement a machine learned model that accesses the control policy 306 to determine actions, trajectories, positions, or other data associated with the vehicle and/or object(s). For instance, the control policy 306 can be used by a machine learned model during a simulation performed by the simulation component 204.

As illustrated in FIG. 3, the output of the simulation component 204 can include predicting scenarios at times T0, T1, . . . TN (where N is an integer greater than 1) indicative of future states of the environment. For example, sensor data associated with the vehicle 102 can be used to perform the scenarios to identify potential objects that may intersect with the vehicle 102 at different times in the future.

In various examples, the tracking trajectory 210 can be determined based at least in part on the control policy 306 and the integration component 308. For instance, the integration component 308 can predict a response by the vehicle 102 to the scenario at time T0, the scenario at time T1, and/or the scenario at time TN based at least in part on data associated with the control policy 306 (e.g., information indicating rules of the road such as a right of way associated with a roadway, an intersection, or a navigable surface). In such examples, the integration component 308 can generate a signal indicative of the responses, and send the signal to another model or component of a vehicle computing device for validating commands such as determinations by the planning component 426 (e.g., determining a candidate trajectory for the vehicle 102).

In some examples, actions by the vehicle and/or an object can change from during the simulation from a first time to a second time.

While described as a separate system, in some examples, techniques to evaluate trajectories described herein in relation to FIGS. 1-3 may be implemented by other vehicle systems, components, and/or computing devices. For example, and as will be described in further detail with regard to FIG. 4, the prediction techniques described herein in relation to FIGS. 1-3 may be implemented at least partially by or in association with a perception component, a planning component, and/or a model component of FIG. 4.

Figure 4:
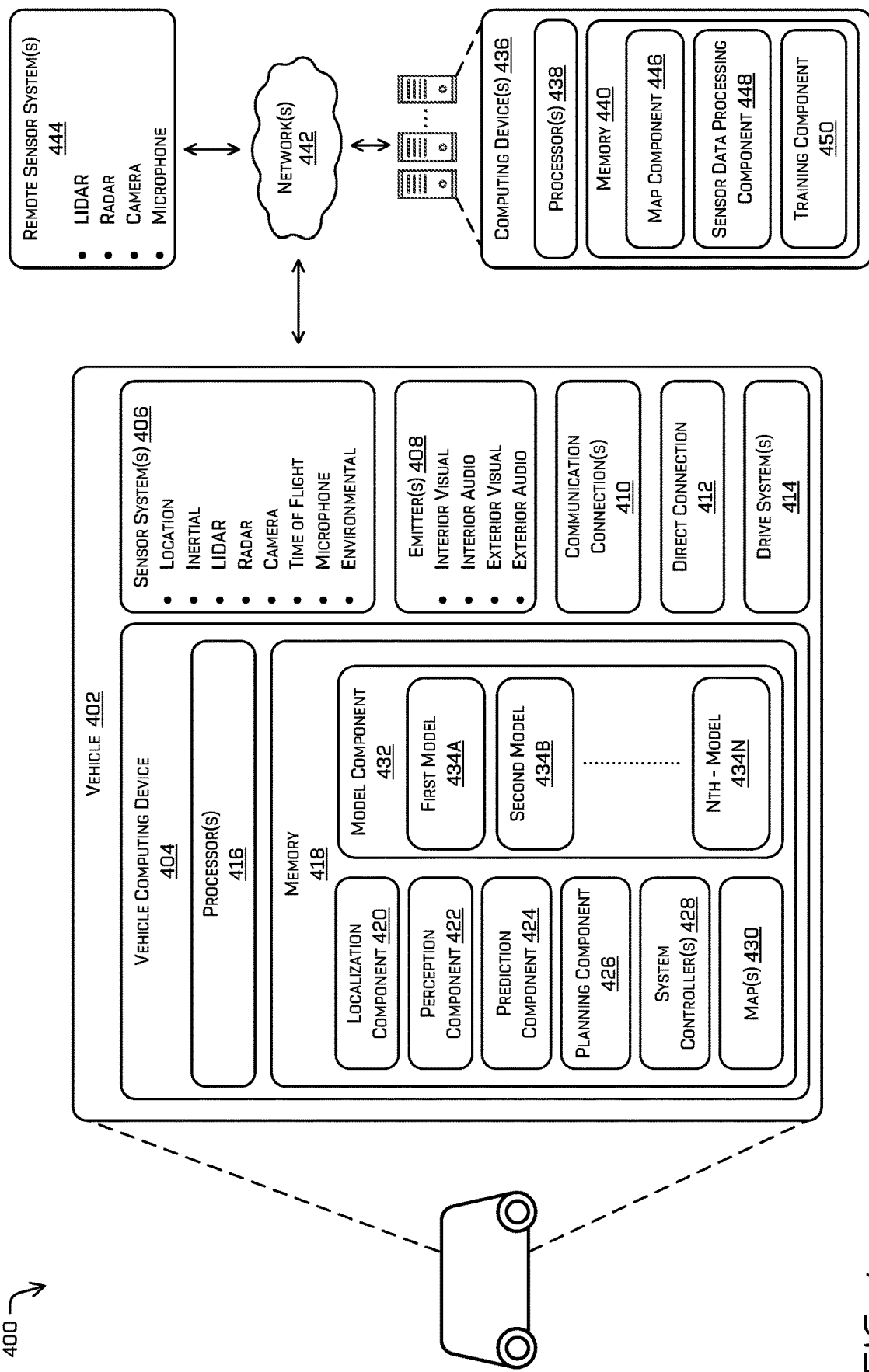
FIG. 4 is a block diagram of an example system for implementing the techniques described herein.

FIG. 4 is a block diagram of an example system 400 for implementing the techniques described herein. In at least one example, the system 400 may include a vehicle, such as vehicle 402.

The vehicle 402 may include a vehicle computing device 404, one or more sensor systems 406, one or more emitters 408, one or more communication connections 410, at least one direct connection 412, and one or more drive system(s) 414.

The vehicle computing device 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In various examples, the vehicle computing device 404 may store sensor data associated with actual location of an object at the end of the set of estimated states (e.g., end of the period of time) and may use this data as training data to train one or more models. In some examples, the vehicle computing device 404 may provide the data to a remote computing device (i.e., computing device separate from vehicle computing device such as the computing device(s) 436) for data analysis. In such examples, the remote computing device(s) may analyze the sensor data to determine an actual location, velocity, direction of travel, or the like of the object at the end of the set of estimated states.

In the illustrated example, the memory 418 of the vehicle computing device 404 stores a localization component 420, a perception component 422, a prediction component 424, a planning component 426, one or more system controllers 428, one or more maps 430, and a model component 432 including one or more model(s), such as a first model 434A, a second model 434B, up to an Nth model 434N (collectively "models 434"), where N is an integer. Though depicted in FIG. 4 as residing in the memory 418 for illustrative purposes, it is contemplated that the localization component 420, the perception component 422, the prediction component 424, the planning component 426, one or more system controllers 428, one or more maps 430, and/or the model component 432 including the model(s) 434 may additionally, or alternatively, be accessible to the vehicle 402 (e.g., stored on, or otherwise accessible by, memory remote from the vehicle 402, such as, for example, on memory 440 of a remote computing device 436).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430 and/or map component 446, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 424 can generate one or more probability maps representing prediction probabilities of possible locations of one or more objects in an environment. For example, the prediction component 424 can generate one or more probability maps for vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., objects) in an environment and/or to generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In general, the planning component 426 may determine a path for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 426 can select a trajectory for the vehicle 402 based at least in part on receiving data representing an output of the model component 432.

In other examples, the planning component 426 can alternatively, or additionally, use data from the localization component 420, the perception component 422, and/or the prediction component 424 to determine a path for the vehicle 402 to follow to traverse through an environment. For example, the planning component 426 can receive data from the localization component 420, the perception component 422, and/or the prediction component 424 regarding objects associated with an environment. Using this data, the planning component 426 can determine a route to travel from a first location (e.g., a current location) to a second location (e.g., a target location) to avoid objects in an environment. In at least some examples, such a planning component 426 may determine there is no such collision free path and, in turn, provide a path which brings vehicle 402 to a safe stop avoiding all collisions and/or otherwise mitigating damage. Additionally or alternatively, the planning component 426 can determine the path for the vehicle 402 to follow based at least in part on data received from the simulation component 204 and/or the tracking component 104 as described in FIG. 3 and elsewhere.

In at least one example, the vehicle computing device 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 430 may be stored on a remote computing device(s) (such as the computing device(s) 436) accessible via network(s) 442. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

As illustrated in FIG. 4, the vehicle computing device 404 may include a model component 432. The model component 432 may be configured to perform the functionality of the tracking component 104, including predicting a tracking trajectory, such as the tracking trajectory 210 of FIG. 2. In various examples, the model component 432 may receive one or more features associated with the detected object(s) from the perception component 422 and/or from the sensor system(s) 406. In some examples, the model component 432 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the model component 432 could be part of the prediction component 424, the planning component 426, or other component(s) of the vehicle 402.

In various examples, the model component 432 may send predictions from the one or more models 434 that may be used by the prediction component 424 and/or the planning component 426 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 426 may determine one or more actions (e.g., reference actions and/or sub-actions) for the vehicle 402, such as vehicle candidate trajectories. In some examples, the model component 432 may be configured to determine whether an object intersects at an intersection point based at least in part on the one or more actions for the vehicle 402. In some examples, the model component 432 may be configured to determine the actions that are applicable to the environment, such as based on environment characteristics, weather characteristics, or the like.

The model component 432 may generate sets of estimated states of the vehicle and one or more detected objects forward in the environment over a time period. The model component 432 may generate a set of estimated states for each action (e.g., reference action and/or sub-action) determined to be applicable to the environment. The sets of estimated states may include one or more estimated states, each estimated state including an estimated position of the vehicle and an estimated position of a detected object(s). In some examples, the estimated states may include estimated positions of the detected objects at an initial time (T=0) (e.g., current time).

The estimated positions may be determined based on a detected trajectory and/or predicted trajectories associated with the object. In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or prediction. In some examples, the model component 432 may utilize physics and/or geometry based techniques, machine learning, linear temporal logic, tree search methods, heat maps, and/or other techniques for determining predicted trajectories and/or estimated positions of objects.

In various examples, the estimated states may be generated periodically throughout the time period. For example, the model component 432 may generate estimated states at 0.1 second intervals throughout the time period. For another example, the model component 432 may generate estimated states at 0.05 second intervals. The estimated states may be used by the planning component 426 in determining an action (e.g., the trajectory 122(1), the trajectory 122(2), and the trajectory 122(3)) for the vehicle 402 to take in an environment.

In various examples, the model component 432 may utilize machine learned techniques to predict risks associated with evaluated trajectories. In such examples, the machine learned algorithms may be trained to determine, based on sensor data and/or previous predictions by the model, that an object is likely to behave in a particular way relative to the vehicle 402 at a particular time during a set of estimated states (e.g., time period). In such examples, one or more of the vehicle 402 state (position, velocity, acceleration, trajectory, etc.) and/or the object state, classification, etc. may be input into such a machine learned model and, in turn, a behavior prediction may be output by the model.

In various examples, characteristics associated with each object type may be used by the model component 432 to determine an object velocity or acceleration usable to predict potential intersection(s) between objects and/or between the vehicle 402 and one or more objects. Examples of characteristics of an object type may include, but not be limited to: a maximum longitudinal acceleration, a maximum lateral acceleration, a maximum vertical acceleration, a maximum speed, maximum change in direction for a given speed, and the like.

As can be understood, the components discussed herein (e.g., the localization component 420, the perception component 422, the prediction component 424, the planning component 426, the one or more system controllers 428, the one or more maps 430, the model component 432 including the model(s) 434 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 442, to the one or more computing device(s) 436 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 436, other nearby vehicles, etc.) and/or one or more remote sensor system(s) 444 for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device 404 to another computing device or a network, such as network(s) 442. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the prediction component 424, the planning component 426, the one or more system controllers 428, the one or more maps 430, and the model component 432, may process sensor data, as described above, and may send their respective outputs, over the one or more network(s) 442, to the computing device(s) 436. In at least one example, the localization component 420, the perception component 422, the prediction component 424, the planning component 426, the one or more system controllers 428, the one or more maps 430, and the model component 432 may send their respective outputs to the remote computing device(s) 436 at a particular frequency, after a lapse of a predetermined period of time, in near real-time, etc.

In some examples, the vehicle 402 may send sensor data to the computing device(s) 436 via the network(s) 442. In some examples, the vehicle 402 may receive sensor data from the computing device(s) 436 and/or remote sensor system(s) 444 via the network(s) 442. The sensor data may include raw sensor data and/or processed sensor data and/or representations of sensor data. In some examples, the sensor data (raw or processed) may be sent and/or received as one or more log files.

The computing device(s) 436 may include processor(s) 438 and a memory 440 storing the map component 446, a sensor data processing component 448, and a training component 450. In some examples, the map component 446 may include functionality to generate maps of various resolutions. In such examples, the map component 446 may send one or more maps to the vehicle computing device 404 for navigational purposes. In various examples, the sensor data processing component 448 may be configured to receive data from one or more remote sensors, such as sensor system(s) 406 and/or remote sensor system(s) 444. In some examples, the sensor data processing component 448 may be configured to process the data and send processed sensor data to the vehicle computing device 404, such as for use by the model component 432 (e.g., the model(s) 434). In some examples, the sensor data processing component 448 may be configured to send raw sensor data to the vehicle computing device 404.

In some instances, the training component 450 can include functionality to train a machine learning model to output evaluate trajectories. For example, the training component 450 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 450 may be executed by the processor(s) 438 to train the a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with evaluated trajectories and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 450 can include functionality to train a machine learning model to output classification values. For example, the training component 450 can receive data that represents labelled collision data (e.g. publicly available data, sensor data, and/or a combination thereof). At least a portion of the data can be used as an input to train the machine learning model. Thus, by providing data where the vehicle traverses an environment, the training component 450 can be trained to output potential intersection(s) associated with objects, as discussed herein.

In some examples, the training component 450 can include training data that has been generated by a simulator. For example, simulated training data can represent examples where a vehicle collides with an object in an environment or nearly collides with an object in an environment, to provide additional training examples.

The processor(s) 416 of the vehicle 402 and the processor(s) 438 of the computing device(s) 436 may be any suitable processor capable of executing instructions to process data and perform operations as described herein. By way of example and not limitation, the processor(s) 416 and 438 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 440 are examples of non-transitory computer-readable media. The memory 418 and memory 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

Figure 5A:
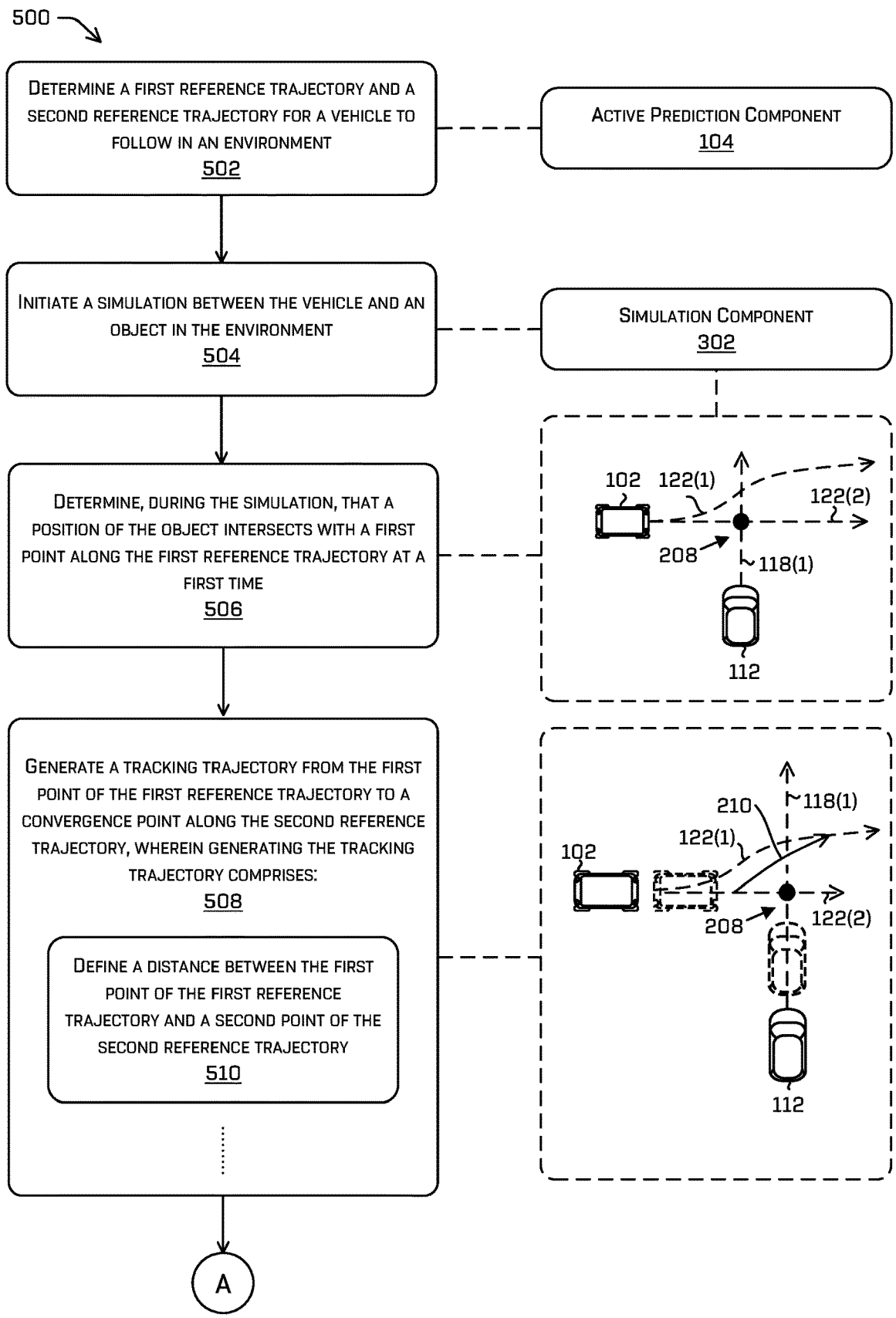
FIG. 5A is a first part of a flowchart depicting an example process for determining a tracking trajectory using one or more example components.

FIG. 5A is a first part of a flowchart depicting an example process 500 for determining a tracking trajectory using one or more example components. For example, some or all of the process 500 can be performed by one or more components in FIG. 4, as described herein. For example, some or all of the process 500 can be performed by the vehicle computing device 404 or the computing device 202.

At operation 502, the process may include determining a first reference trajectory and a second reference trajectory for a vehicle to follow in an environment. In some examples, the operation 502 may include a vehicle computing device capturing sensor data from a lidar sensor, a radar sensor, and so on, of the vehicle 402. The sensor data may be received from one or more sensors on the vehicle and/or from one or more remote sensors. In some examples, one or more trajectories can be predicted by a vehicle computing device (e.g., the prediction component 424) for the vehicle 402 and each detected object in an environment surrounding the vehicle. The trajectories 122(1), 122(2), and 122(3) may be determined by the prediction component 424, for example.

At operation 504, the process may include initiating a simulation between the vehicle and an object in the environment. In some examples, the operation 504 may include a vehicle computing device implementing the simulation component 204 (or different model) that is configured to predict, infer, estimate, or otherwise determine whether object trajectories intersect or interact with a trajectory of the vehicle (e.g., a reference trajectory). In various examples, the simulation can identify potential interactions between the first reference trajectory and the second first reference trajectory for the vehicle 402 and each detected object at various intersection points representing potential future positions of each object and the vehicle.

In various examples, the tracking component 104 can implement the simulation component 204 comprising one or more machine learned models to determine which of the one or more object trajectories intersects with a vehicle trajectory, and update an object trajectory based on a control policy that includes logic for determining rules of the road for the objects and vehicle in the environment (e.g., which object has the right of way, which object responds to a traffic signal, speed bump, and so on).

At operation 506, the process may include determining, during the simulation, that a position of the object intersects with a first point along the first reference trajectory at a first time. In some examples, the operation 506 may include the simulation component 204 receiving the input data 106 (e.g., object state data associated with each object) to identify a first object (e.g., the object 112) that is most likely to reach an intersection point with the vehicle 102 before a second object (e.g., the object 110). The simulation component 204 can identify an intersection point (e.g., the intersection point 208) along the first reference trajectory intersection (e.g., the trajectory 122(2)). For instance, a tree search algorithm can determine an output from searching a decision tree comprising the vehicle and object trajectories. In some examples, an node of the decision tree can indicate for the vehicle to switch from a first trajectory to a second trajectory. In various examples, searching the decision tree can include considering multiple potential trajectories changes over time and outputting a resultant trajectory defined by nodes associated with the multiple trajectories of the tree search at different periods of time.

At operation 508, the process may include generating a tracking trajectory from the first point of the first reference trajectory to a convergence point along the second reference trajectory. In some examples, the operation 508 may include the tracking component 104 determining the tracking trajectory 210 from the initial point 310 of the trajectory 122(2) to the convergence point 312 of the trajectory 122(1).

The operation 508 may include, in some examples, the memory allocation component 206 allocating data for input into a parallel processing unit such as the reference points 316 and other data usable for determining the points associated with the tracking trajectory 210 such as the tracking points 316, as discussed herein.

At operation 510, the process may include defining a distance between the first point of the first reference trajectory and a second point of the second reference trajectory, the first point and the second point associated with the first time. In some examples, the operation 510 may include the tracking component 104 determining the initial distance 318 between the initial point 310 and a point corresponding to the trajectory 122(1) at a same time. In various examples, the distance between the points can represent a difference in vehicle states of two positions including differences in heading, velocity, and/or acceleration, etc.

Figure 5B:
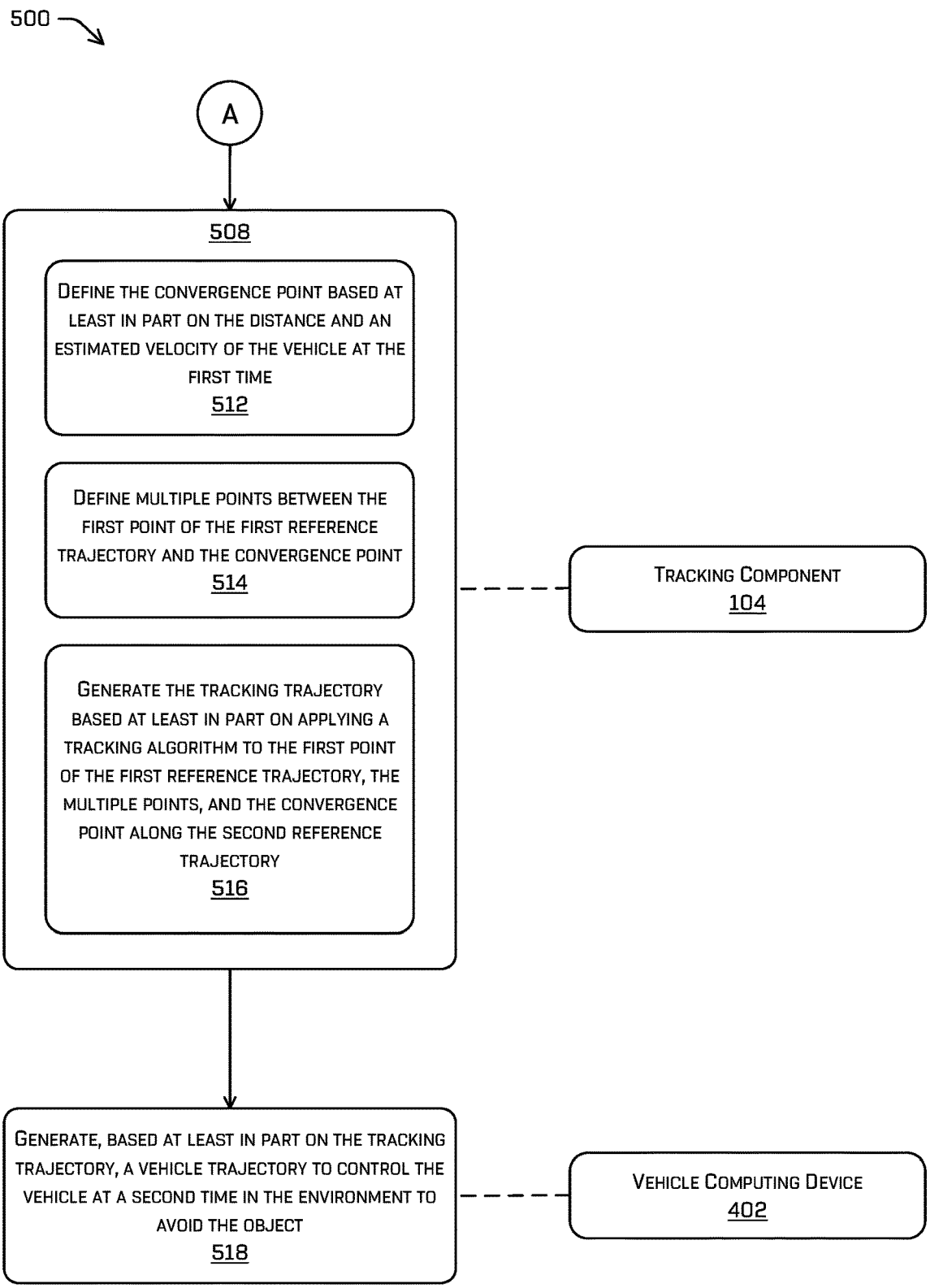
FIG. 5B is a second part of the flowchart depicting the example process for determining a tracking trajectory using one or more example components.

FIG. 5B is a second part of the flowchart depicting the example process for determining a tracking trajectory using one or more example components.

At operation 512, the process may include defining the convergence point based at least in part on the distance and an estimated velocity of the vehicle at the first time. In some examples, the operation 512 may include the tracking component 104 implementing the point generator 302 to determine the convergence point 312. In various examples, a position of the convergence point 312 may depend on the initial point 310 and a predicted velocity of the vehicle 102. In various examples, the tracking component 104 can determine the initial point 310 and/or the convergence point 312 based at least in part on vehicle state data at one or more times along one or more trajectories (associated with the trajectory 122(1) and/or the trajectory 122(2)).

At operation 514, the process may include defining multiple points between the first point of the first reference trajectory and the convergence point. For instance, the point generator 302 can determine tracking points 314 based at least in part on state data associated with the reference points 316. In some examples, a tracking point can be determined based on an offset distance from a corresponding reference point (e.g., to get a first coordinate) associated with a same time. Additionally or alternatively, the point generator 302 can determine a tracking point based on an error in a first velocity of the first reference trajectory and a second velocity of the second reference trajectory (e.g., to get a second coordinate). In some examples, a position of a tracking point can be determined based at least in part on interpolating the position of a preceding tracking point.

At operation 516, the process may include generating the tracking trajectory based at least in part on applying a tracking algorithm to the first point of the first reference trajectory, the multiple points of the tracking trajectory, and the convergence point along the second reference trajectory. For example, the trajectory component 304 can implement one or more algorithms (e.g., a polynomial equation, an exponential equation, etc.) to position the aforementioned points relative to one another to generate a curve that defines the tracking trajectory 210.

At operation 518, the process may include generating, based at least in part on the tracking trajectory, a vehicle trajectory to control the vehicle at a second time in the environment to avoid the object. In some examples, the operation 512 may include the planning component 426 utilizing information associated with the tracking trajectory 210 to determine a candidate trajectory or other action for the vehicle to avoid the potential intersections between the objects and the vehicle. In some examples, the operation 518 may include controlling, by the vehicle computing device 404, the vehicle in an environment in the future based at least on the information from the tracking component 104.

In various examples, process 500 may return to 502 after performing operation 514. In such examples, the vehicle may continuously monitor for potential collisions and update/modify decisions regarding whether to engage a safety system or not (which may, in at least some examples, include performing one or more maneuvers to mitigate or minimize an impact). In any of the examples described herein, the process may repeat with a given frequency and generate one or more occupancy grids associated with one or more multiple times in the future for making the determinations above.

FIGS. 5A and 5B illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes. For instance, the example process may omit operation 518 and instead verify operation of a vehicle controller. The example process may also or instead omit operation 506 and instead determine the tracking trajectory(ies) independent of determining an intersection point with an object.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: determining a first reference trajectory and a second reference trajectory for a vehicle to follow in an environment; determining, based at least in part on a tree search, for the vehicle to switch from the first reference trajectory to the second reference trajectory, the second reference trajectory defined by a set of reference points; determining, based at least in part on an initial distance from the second reference trajectory to the vehicle, a convergence point along the second reference trajectory; determining a set of tracking points defining a tracking trajectory based at least in part on a function, the convergence point, and the set of reference points; and generating, based at least in part on the tracking trajectory, a vehicle trajectory to control the vehicle at a second time in the environment to avoid an object.

B: The system of paragraph A, wherein the function comprises one or more of a polynomial or an exponential function having parameters such that an output of the function smoothly varies with respect to an arc-length along the second reference trajectory.

C: The system of paragraph A or B, the operations further comprising: receiving vehicle state data indicating an orientation, a velocity, and an acceleration of an autonomous vehicle; wherein generating the tracking trajectory is based at least in part on the vehicle state data.

D: The system of any of paragraphs A-C, the operations further comprising: determining a set of modified trajectory points based at least in part on interpolating the set of trajectory points such that subsequent points in the set of modified trajectory points are spaced uniformly in one or more of a spatial domain or temporal domain.

E: The system of any of paragraphs A-D, wherein the set of tracking points are determined substantially simultaneously.

F: One or more non-transitory computer-readable media storing instructions executable by one or more processors, wherein the instructions, when executed, cause the one or more processors to perform operations comprising: determining a first reference trajectory and a second reference trajectory for a vehicle to follow in an environment; determining, at a future time, to switch from the first reference trajectory to the second reference trajectory; determining an initial distance between a current position of the vehicle and the second reference trajectory; determining a convergence point along the second reference trajectory based at least in part on the initial distance; determining, based at least in part on a smoothing function, a set of points between the current position and the convergence point, the set of points defining a tracking trajectory; and outputting the tracking trajectory to a vehicle computing device for controlling the vehicle.

G: The one or more non-transitory computer-readable media of paragraph F, wherein the smoothing function comprises one or more of a polynomial or an exponential function having parameters such that an output of the smoothing function varies with respect to an arc-length along the second reference trajectory.

H: The one or more non-transitory computer-readable media of paragraph F or G, wherein determining the tracking trajectory is based at least in part on state data associated with the vehicle.

I: The one or more non-transitory computer-readable media of any of paragraphs F-H, the operations further comprising: determining a set of modified trajectory points based at least in part on interpolating the set of trajectory points such that subsequent points in the set of modified trajectory points are spaced uniformly in one or more of a spatial domain or temporal domain.

J: The one or more non-transitory computer-readable media of any of paragraphs F-I, wherein the set of tracking points are determined substantially simultaneously.

K: The one or more non-transitory computer-readable media of any of paragraphs F-J, wherein the convergence point is further based at least in part on a current velocity of the vehicle.

L: The one or more non-transitory computer-readable media of any of paragraphs F-K, wherein: the convergence point represents a length along the second reference trajectory at which the tracking trajectory within a threshold distance of the second reference trajectory, and the convergence point is based at least in part on a state of the vehicle.

M: The one or more non-transitory computer-readable media of any of paragraphs F-L, wherein: the first reference trajectory and the second reference trajectory represent respective branches of a decision tree, and determining to switch is based at least in part on an output of the decision tree.

N: The one or more non-transitory computer-readable media of any of paragraphs F-M, the operations further comprising: receiving an indication of an object proximate the vehicle; determining, based at least in part on the set of tracker points, a future state of the object; and determining, based at least in part on the future state of the object, whether the object intersects the tracking trajectory, wherein controlling the vehicle is further based at least in part on whether the object intersects the tracking trajectory.

O: The one or more non-transitory computer-readable media of any of paragraphs F-N, the operations further comprising: determining a first heading of the first reference trajectory and a second heading of the second reference trajectory; and determining a difference between the first heading and the second heading, wherein determining the set of points defining the tracking trajectory is further based at least in part on the difference between the first heading and the second heading.

P: The one or more non-transitory computer-readable media of any of paragraphs F-O, the operations further comprising: modifying a number of points in the set of the points; and determining a modified tracking trajectory based at least in part on the modifying, wherein the modified tracking trajectory is output to the vehicle computing device.

Q: A method comprising: determining a first reference trajectory and a second reference trajectory for a vehicle to follow in an environment; determining, at a future time, to switch from the first reference trajectory to the second reference trajectory; determining an initial distance between a current position of the vehicle and the second reference trajectory; determining a convergence point along the second reference trajectory based at least in part on the initial distance; determining, based at least in part on a smoothing function, a set of points between the current position and the convergence point, the set of points defining a tracking trajectory; and outputting the tracking trajectory to a vehicle computing device for controlling the vehicle.

R: The method of paragraph Q, wherein the smoothing function comprises one or more of a polynomial or an exponential function having parameters such that an output of the smoothing function varies with respect to an arclength along the second reference trajectory.

S: The method of paragraph Q or R, further comprising: determining a set of modified trajectory points based at least in part on interpolating the set of trajectory points such that subsequent points in the set of modified trajectory points are spaced uniformly in one or more of: a spatial domain or temporal domain.

T: The method of any of paragraphs Q-S, wherein the set of tracking points are determined substantially simultaneously.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
determining a first reference trajectory and a second reference trajectory for a vehicle to follow in an environment;
determining, based at least in part on a tree search and an indication of a potential intersection between the vehicle and a dynamic object, for the vehicle to switch from the first reference trajectory to the second reference trajectory, the second reference trajectory defined by a set of reference points;
determining, based at least in part on an initial distance from the second reference trajectory to the vehicle, a convergence point along the second reference trajectory;
determining a set of tracking points defining a tracking trajectory based at least in part on a function, the convergence point, and the set of reference points; and generating, based at least in part on the tracking trajectory, a vehicle trajectory to control the vehicle at a second time in the environment to avoid the dynamic object.

2. The system of claim 1, wherein the function comprises one or more of a polynomial or an exponential function having parameters such that an output of the function smoothly varies with respect to an arclength along the second reference trajectory.

3. The system of claim 1, the operations further comprising:
receiving vehicle state data indicating an orientation, a velocity, and an acceleration of an autonomous vehicle;
wherein generating the tracking trajectory is based at least in part on the vehicle state data.

4. The system of claim 1, the operations further comprising:
determining a set of modified trajectory points based at least in part on interpolating the set of tracking points such that subsequent points in the set of modified trajectory points are spaced uniformly in one or more of: a spatial domain or temporal domain.

5. The system of claim 1, wherein the set of tracking points are determined simultaneously.

6. One or more non-transitory computer-readable media storing instructions executable by one or more processors, wherein the instructions, when executed, cause the one or more processors to perform operations comprising:
determining a first reference trajectory and a second reference trajectory for a vehicle to follow in an environment;
determining, at a future time and based at least in part on and an indication of a potential intersection between the vehicle and a dynamic object, to switch from the first reference trajectory to the second reference trajectory;
determining an initial distance between a current position of the vehicle and the second reference trajectory;
determining a convergence point along the second reference trajectory based at least in part on the initial distance;
determining, based at least in part on a smoothing function, a set of points between the current position and the convergence point, the set of points defining a tracking trajectory; and
outputting the tracking trajectory to a vehicle computing device for controlling the vehicle to avoid the dynamic object.

7. The one or more non-transitory computer-readable media of claim 6, wherein the smoothing function comprises one or more of a polynomial or an exponential function having parameters such that an output of the smoothing function varies with respect to an arclength along the second reference trajectory.

8. The one or more non-transitory computer-readable media of claim 6, wherein determining the tracking trajectory is based at least in part on state data associated with the vehicle.

9. The one or more non-transitory computer-readable media of claim 6, the operations further comprising:
determining a set of modified trajectory points based at least in part on interpolating the set of points such that subsequent points in the set of modified trajectory points are spaced uniformly in one or more of: a spatial domain or temporal domain.

10. The one or more non-transitory computer-readable media of claim 6, wherein the set of points are determined simultaneously.

11. The one or more non-transitory computer-readable media of claim 6, wherein the convergence point is further based at least in part on a current velocity of the vehicle.

12. The one or more non-transitory computer-readable media of claim 6, wherein:
the convergence point represents a length along the second reference trajectory at which the tracking trajectory within a threshold distance of the second reference trajectory, and
the convergence point is based at least in part on a state of the vehicle.

13. The one or more non-transitory computer-readable media of claim 6, wherein:
the first reference trajectory and the second reference trajectory represent respective branches of a decision tree, and
determining to switch is based at least in part on an output of the decision tree.

14. The one or more non-transitory computer-readable media of claim 6, the operations further comprising:
receiving an indication of an object proximate the vehicle;
determining, based at least in part on the set of points, a future state of the object; and
determining, based at least in part on the future state of the object, whether the object intersects the tracking trajectory,
wherein controlling the vehicle is further based at least in part on whether the object intersects the tracking trajectory.

15. The one or more non-transitory computer-readable media of claim 6, the operations further comprising:
determining a first heading of the first reference trajectory and a second heading of the second reference trajectory; and
determining a difference between the first heading and the second heading,
wherein determining the set of points defining the tracking trajectory is further based at least in part on the difference between the first heading and the second heading.

16. The one or more non-transitory computer-readable media of claim 6, the operations further comprising:
modifying a number of points in the set of the points; and
determining a modified tracking trajectory based at least in part on the modifying,
wherein the modified tracking trajectory is output to the vehicle computing device.

17. A method comprising:
determining a first reference trajectory and a second reference trajectory for a vehicle to follow in an environment;
determining, at a future time and based at least in part on and an indication of a potential intersection between the vehicle and a dynamic object, to switch from the first reference trajectory to the second reference trajectory;
determining an initial distance between a current position of the vehicle and the second reference trajectory;
determining a convergence point along the second reference trajectory based at least in part on the initial distance;
determining, based at least in part on a smoothing function, a set of points between the current position and the convergence point, the set of points defining a tracking trajectory; and
outputting the tracking trajectory to a vehicle computing device for controlling the vehicle to avoid the dynamic object.

18. The method of claim 17, wherein the smoothing function comprises one or more of a polynomial or an exponential function having parameters such that an output of the smoothing function varies with respect to an arclength along the second reference trajectory.

19. The method of claim 17, further comprising:
  determining a set of modified trajectory points based at least in part on interpolating the set of points such that subsequent points in the set of modified trajectory points are spaced uniformly in one or more of: a spatial domain or temporal domain.

20. The method of claim 17, wherein the set of points are determined simultaneously.

\* \* \* \* \*